April 29, 1947.  B. L. MILLS  2,419,906
SWIVEL PIPE JOINT
Filed Aug. 9, 1944  2 Sheets-Sheet 1
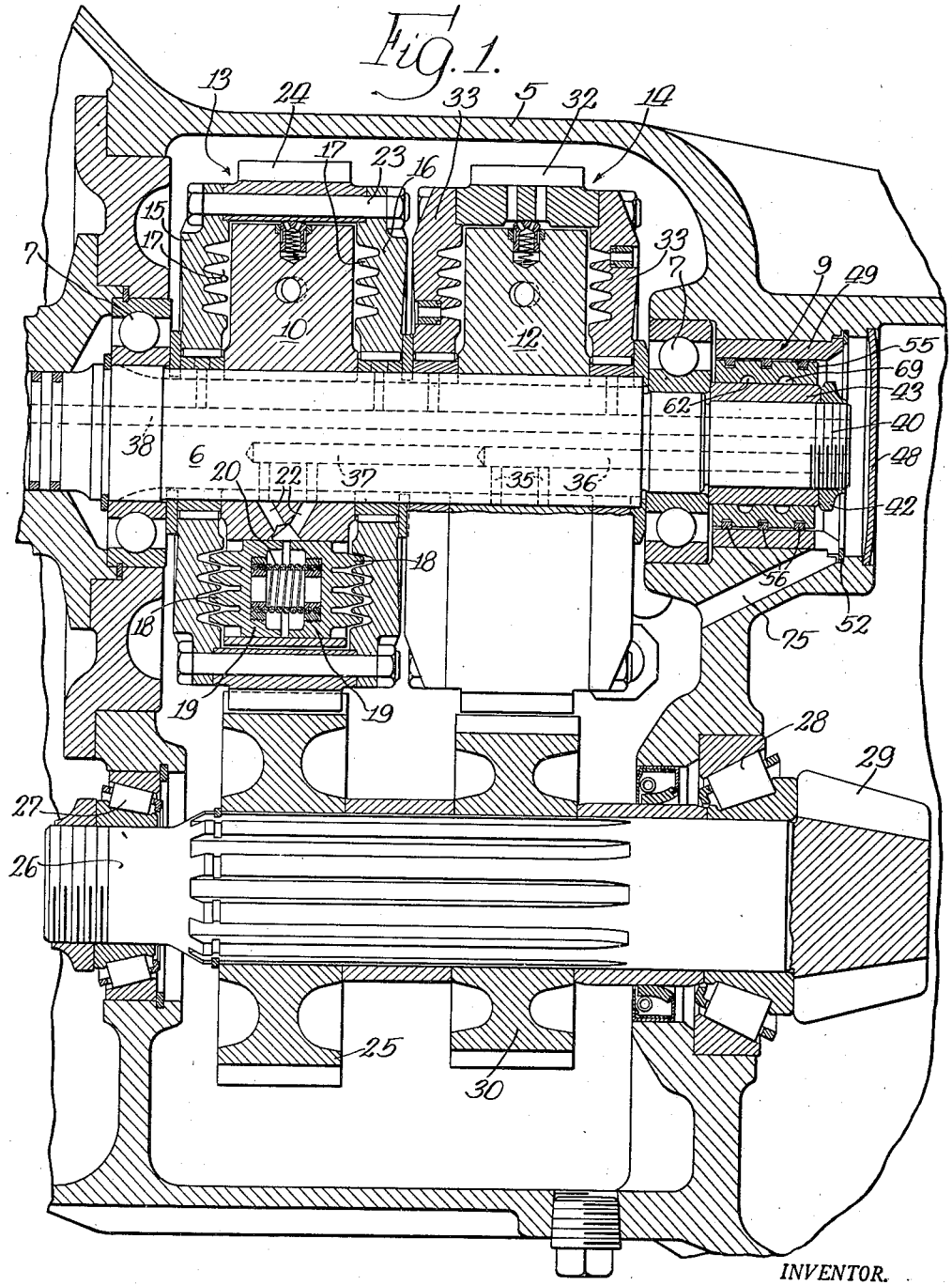
INVENTOR.
Burton L. Mills,
BY Walter E. Schirmer
Atty.

April 29, 1947.    B. L. MILLS    2,419,906
SWIVEL PIPE JOINT
Filed Aug. 9, 1944    2 Sheets-Sheet 2

INVENTOR.
Burton L. Mills,
BY Walter E. Schirmer
Atty.

Patented Apr. 29, 1947

2,419,906

UNITED STATES PATENT OFFICE 2,419,906

SWIVEL PIPE JOINT

Burton L. Mills, Buchanan, Mich., assignor to Clark Equipment Company, Buchanan, Mich., a corporation of Michigan Application August 9, 1944, Serial No. 548,741

9 Claims. (Cl. 285—96.3)

This invention relates to automatic transmissions, and more particularly is directed to an automatic transmission of the type having a fluid pressure operated control system for selectively clutching transmission gears in and out of locking engagement to provide various speed ratios within the transmission.

In automatic transmissions employing a torque converter or other fluid torque multiplying mechanism in combination with gear trains, it has been proposed to provide fluid pressure operated means responsive to the speed and load on the vehicle for selecting the various gear ratios in the transmission and for coupling and uncoupling such gears to effect these gear ratios. One form of such type of transmission is disclosed in the copending application of Robert Lapsley, Serial No. 526,829, filed March 15, 1944, in which there is provided two separate gear trains in the transmission, the gears on the driven shaft of the torque converter being provided with fluid pressure operated internal clutch means for selectively coupling them to the shaft to effect the desired driving ratios. The present invention is directed particularly to the provision of oil pressure distributing system for controlling the operation of the clutches, this mechanism being mounted in the end of the shaft between the oil passageways leading to the clutch mechanism within the gears and the fluid pressure lines coming from the control valve.

One object of the present invention is to provide an oil distributing mechanism which will be simple in design and assembly, which will insure adequate flow of the fluid under pressure to the internal gear clutch, and which will at all times be maintained balanced to a point where there is no excessive end thrust produced.

Another object of the present invention is to provide such an assembly which may be readily assembled into or taken out of the transmission assembly for inspection, repair, or maintenance purposes, and shall at all times maintain a balanced fluid pressure in the system to prevent any undue or objectionable end thrust within the oil distributing assembly.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a sectional view through a transmission embodying the present invention;

Figure 3:
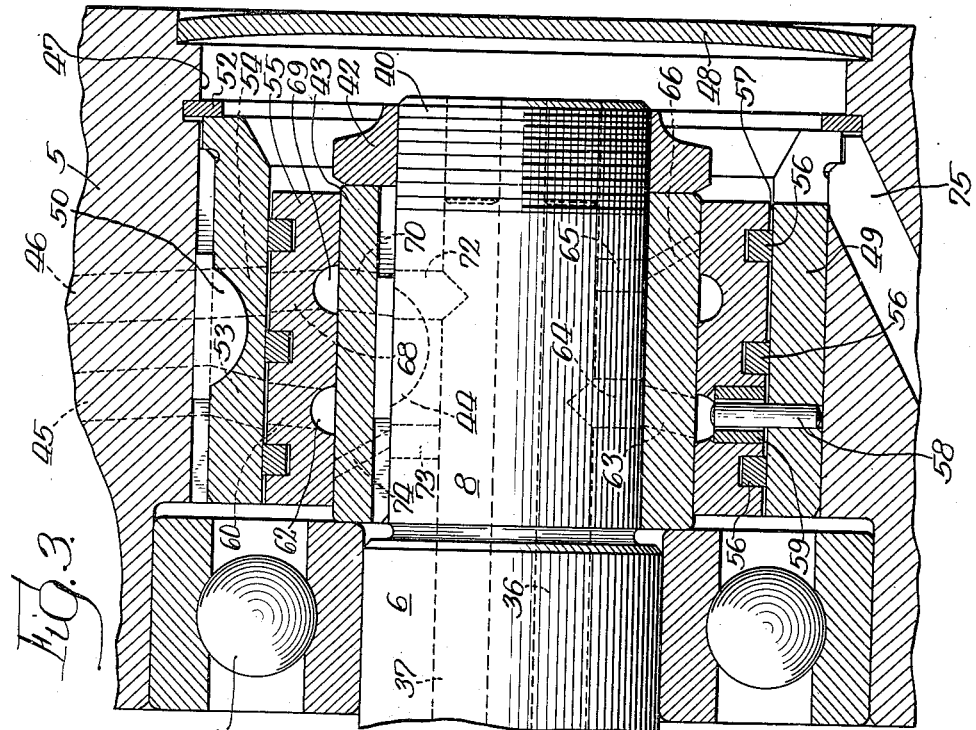
Figure 3 is a sectional view taken substantially along lines 33 of Figure 2.

Referring now in detail to Figure 1, there is disclosed a transmission housing 5 having the shaft 6 extending therethrough, this shaft preferably being driven from the rotor unit of a fluid torque converter or the like. The shaft 6 is mounted in suitable ball bearings 7 carried by the housing 5 and is provided at its end with a reduced portion 8 carrying the oil distributor mechanism indicated generally at 9.

Mounted on the shaft 6 are the hub portions 10 and 12 of gear assemblies 13 and 14, respectively, the hub elements 10 and 12 being keyed or splined to the shaft for conjoint rotation therewith.

The gear assembly 13 includes two radial flange elements 15 and 16 mounted upon suitable needle rollers or the like supported by bushings secured on the surface of the shaft 6 on opposite sides of the hub member 10. The adjacent faces of the discs 15 and 16 are provided with annular grooved rings 17 adapted to receive the corresponding axially extending arcuate fins 18 of piston members 19 mounted at circumferentially spaced points within the hub member 10 and normally held in retracted position by means of spring 20. When the pistons are expanded or separated by fluid pressure introduced through the ports 22 they move into clutching engagement with the annular ribbed surfaces 17 to couple these members to the hub 10 for conjoint rotation therewith and with the shaft 6. The two flange members 15 and 16 carry at their outer periphery a circumferential series of studs 23 which secure the gear element 24 thereto, whereby the gear element 24 is coupled to the shaft 6 by the action of the pistons 19.

The gear element 24 is in constant meshing engagement with a gear 25 mounted on the output shaft 26 of the transmission, which shaft is carried in the tapered roller bearing assemblies 27 and 28 and is provided at its end with a pinion 29 adapted for driving engagement with the ring gear of an axle differential. Consequently, when the gear 24 is clutched to the shaft 26 driving engagement is provided by the shaft 6 and the shaft 26 in accordance with the torque imposed on the shaft 6 by a torque converter or similar device disposed forwardly thereof. It is, of course, understood that the oil distributor may be applied to other types of transmissions where the shaft 6 is the output shaft and the shaft 26 is a countershaft, or any other combinations of gearing within a transmission using this type of clutch engagement.

To provide reverse rotation of the shaft 26 this shaft is provided with a second gear 30 splined thereon and in meshing engagement with an idler gear (not shown) which in turn is engaged by the annular gear element 32 carried by the side flange plates 33 of the gear assembly 14. This gear assembly is similar to the assembly 13 and circumferential series of pistons corresponding to the piston 19 are provided for clutching the gear 32 to the hub element 12 for driving the gear 32 conjointly with the shaft 6. This gear in turn meshes with the idler gear and thence drives the gear 30 for providing reverse rotation of shaft 26. The clutch elements within the gear hub 12 are provided with oil pressure through radial ports 35 formed in the shaft 6 and communicating with an axially extending passageway 36 leading to the reduced end 8 of the shaft. Similarly, the ports 22 for the clutch elements within the gear hub 10 are connected to an axial passageway 37 also leading to the reduced end 8 of this shaft. There is provided in the reduced end 8 of the shaft an oil control or distributor mechanism for selectively admitting oil from the control valve (not shown) into the passageways 36 or 37 to provide for selectively energizing and coupling the gear elements 24 and 32 to the shaft. A third axially extending passageway 38 is provided in the shaft 6 and is provided with radial ports for lubricating the needle rollers upon which the radial plates 15, 16 and 33 are mounted and also provides for lubrication of bearing points along the shaft.

Figure 2:
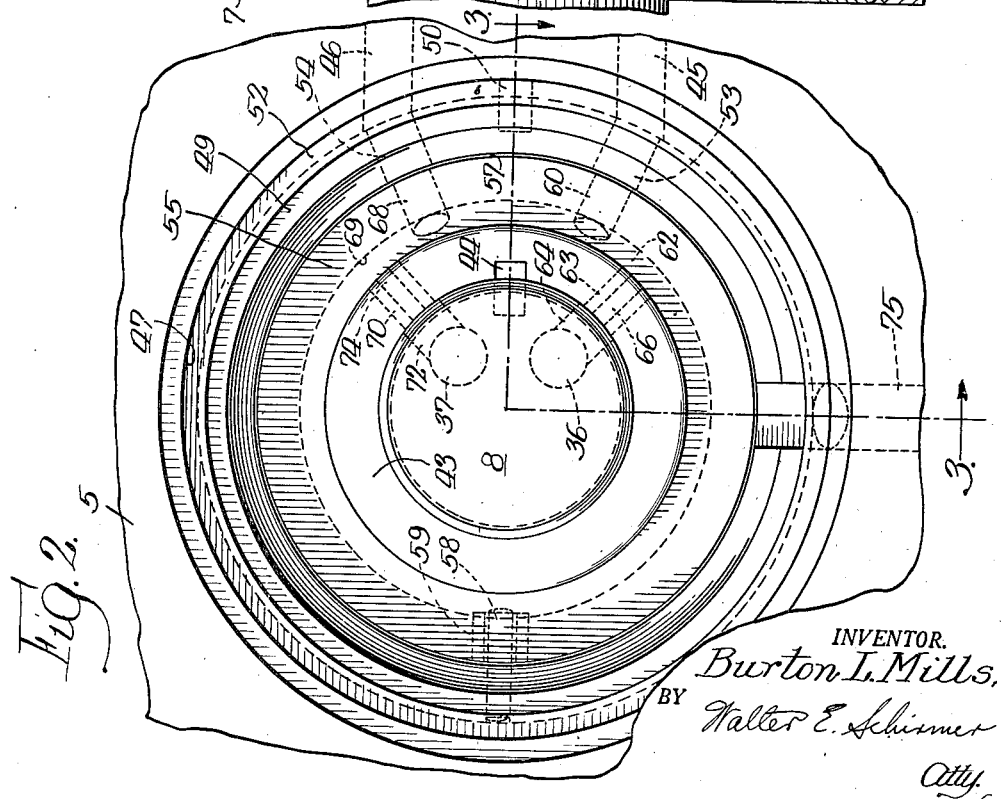
Figure 2 is an end elevational view of the oil distributor assembly shown in Figure 1.

Considering now in detail the oil distributor assembly 9 at the reduced end 8 of the shaft 6, attention is directed to Figures 2 and 3. It will be noted that the shaft 6 extends through the bearing assembly 7 and is then reduced as at 8, terminating in a threaded end portion 40 carrying a lock nut 42 which is adapted to engage against the annular sleeve member 43 extending about the reduced portion 8 of the shaft and bearing against the inner race of the bearing assembly 7. The sleeve 43 is keyed to the shaft portion 8 as by means of the key 44 so as to rotate conjointly therewith.

Extending through the housing 5 and directed radially toward the shaft portion 8 are two fluid pressure conducting passageways 45 and 46, which passageways terminate at the enlarged bore 47 formed in the end of the housing, which bore is closed by the closure plate 48 sprung into a recessed shoulder in this bore.

An external annular sleeve 49 is mounted in the bore 47 and is secured nonrotatively within this bore by means of the key 50. A suitable snap ring 52 maintains the sleeve 49 against axial movement. Formed in the sleeve 49 in alignment with the passageways 45 and 46 are passageways 53 and 54, respectively, which are directed radially inwardly to provide continuations of the passageways 45 and 46.

Mounted in floating arrangement between the inner sleeve 43 and the outer sleeve 49 is a floating ring 55 which is provided with axially spaced external grooves receiving the piston rings 56, these rings being normally biased outwardly so as to float the intermediate sleeve 55 in position between the sleeves 43 and 49 and to provide suitable oil seals preventing radial displacement of fluid from the passageway 43 beyond the adjacent piston ring. The fluid under pressure is admitted from passageway 45 through passageway 53 to the sleeve 55. The clearance indicated at 57 provided between rings 56 will allow equal pressure to be exerted against the adjacent side faces of the rings, thereby balancing the intermediate member 55 between the two sleeves. However, to prevent relative axial or circumferential movement of the intermediate member 55 with respect to the housing 5, there is provided a pin 58 carried by the outer sleeve 49 and directed radially inwardly into the bushing 59 formed in the intermediate member 55 locking this member to the outer sleeve 49. A suitable radial port 60 is provided in the intermediate member 55 in alignment with the port 53 in the sleeve 49 and opens into a semi-circular annular groove 62 formed in the inner annular surface of the intermediate member 55.

The inner sleeve 43 which rotates conjointly with the shaft portion 8 is provided with an inwardly extending passageway 63 which at its outer end is in alignment with the groove 62 and at its inner end opens into the radial passageway 64 formed in the shaft portion 8 and opening into the axial bore 36 in the shaft 6. Thus, when fluid under pressure is introduced from the control valve into the passageway 45 it passes through this passageway into the port 53 in the outer sleeve 49, thence through the port 60 in the intermediate member 55 to the groove 62 and from this groove through the aligned passageways 63 and 64 into the axial bore 36 for actuating the clutches within the hub member 12 to clutch the gear element 32 to the shaft 6. At the same time a portion of the fluid under pressure within the passageway 36 is allowed to move outwardly through the radial port 65 and the port 66 to the interengaging surfaces between the surface of the inner sleeve 43 and the inner annular surface of the intermediate member 55. This provides a thin oil film on these surfaces to provide for lubrication therebetween and to float the intermediate member on the film carried by the annular external surface of the sleeve 43.

When it is desired to engage the gear element 24 with the shaft 6, fluid is admitted under pressure from the control valve through the passageway 46 and the passageway 54 in the outer sleeve 49 to an aligned port 68 formed in the intermediate member 55 and communicating with the arcuate annular groove 69 formed on the inner annular surface of the intermediate member 55. From this groove 69 the fluid under pressure is directed through the radial port 70 in the inner sleeve 43, through the port 72 formed in the shaft 8 and thence through the axially extending passageway 37 leading to the clutch elements 19 carried by the gear assembly 13. It will be noted that in this latter case the oil pressure between the passageways 54 and 68 which may extend axially about the intermediate member 55 is exerted against the adjacent radial faces of the piston rings 56, thereby again balancing the member 55 against axial end thrust.

The shaft portion 8 is provided with a small radial port 73 communicating with the bore 37 and in alignment with the diagonal passageway 74 leading through the inner sleeve 43 out to the surfaces between the sleeve 43 and the intermediate member 55. This provides lubrication of these surfaces in the same manner as is provided by ports 65 and 66.

It will therefore be apparent that with this type of assembly the control of the respective clutch assemblies 13 and 14 is provided by a distributor mechanism which insures that the fluid under pressure from the control valve is directed into the axial bore within the shaft 6 communicating with the clutch elements of the selected gear, and that adequate lubrication is provided for the relatively rotating parts of the distributor assembly. Also, by the use of the intermediate member 55 with its rings 56, the member 55 is supported in floating position between the relatively rotating rings 43 and 49. With such a construction there is no appreciable wear upon these elements under long periods of usage, and inasmuch as the oil pressures are all balanced there is no appreciable end thrust. This floating construction also accommodates any endwise movement of the shaft or any deflection thereof caused by excessive gear loading.

The entire assembly is capable of ready removal by removing the snap ring 52 and the nut 42, whereby all of the parts may be withdrawn axially outwardly of the end of the shaft.

To provide for whatever leakage may occur between the inner engaged surfaces of the sleeve 43 and the intermediate member 55, and also any leakage which may escape past the rings 56, there is provided an oil drain hole 75 leading downwardly from the housing 5 into the bottom of the housing, this drain hole being indicated also in Figure 1.

I am aware that certain changes may be made in details of the present construction without departing from the underlying principles of the construction thereof, and I therefore do not intend to be limited except as defined by the scope and spirit of the appended claims.

I claim:

1. The combination, with a transmission shaft having a plurality of axial bores therein terminating adjacent one end of said shaft in axially spaced radial openings, of means for selectively admitting fluid under pressure into said bores comprising an inner sleeve fixed on said shaft and having radial ports therethrough in alinement with said openings, an intermediate sleeve having internal annular grooves in line with said ports, each of said grooves having a radial inlet, a fixed outer sleeve having clearance about said intermediate sleeve providing for deflection of said transmission shaft and having means therethrough providing communication between fluid pressure lines and said inlets.

2. The combination of claim 1 including means for preventing relative axial or rotational displacement between said outer and intermediate sleeves.

3. The combination of claim 1 including annular pressure seal rings carried by said intermediate sleeve on opposite sides of said inlets to prevent leakage of fluid axially through the clearance between said intermediate and outer sleeves.

4. Means for admitting fluid under pressure from stationary fluid pressure conduits into internal axial bores in a rotating shaft comprising a pair of coaxial inner and outer sleeves on said shaft, the inner sleeve being fixed to said shaft and the outer sleeve being held against rotation, means for mounting said outer sleeve with respect to said inner sleeve to provide for deflection of said shaft, alined radial passageways from said bores to the external surface of said inner sleeve and axially and circumferentially offset, annular internal grooves in the outer sleeve axially spaced in alinement with said passageways, radial inlets from the external surface of said outer sleeve to said grooves, and means providing communication between said conduits and said inlets.

5. Means for admitting fluid under pressure from stationary fluid pressure conduits into internal axial bores in a rotating shaft comprising coaxial inner, intermediate, and outer sleeves on said shaft, the inner sleeve being fixed on said shaft and having radial passageways therethrough communicating with said bores, said passageways being axially and circumferentially offset, the intermediate sleeve having internal axially spaced annular grooves in alinement with said passageways and including radially outwardly extending inlets, the outer sleeve being fixed against rotation and having radial ports in axially spaced relationship providing communication between said pressure lines and said inlets, and means for mounting said intermediate sleeve between said inner and outer sleeves to provide for deflection of said shaft.

6. The means of claim 5 including interconnecting means limiting relative axial or rotative movement between said intermediate and outer sleeve.

7. Means for admitting fluid under pressure from a stationary fluid pressure conduit into an internal axial bore in a rotating shaft comprising a fixed outer sleeve coaxial with said shaft and having a fluid passageway in communication with said pressure conduit, a second sleeve coaxial with said outer sleeve, said second sleeve having fluid passageway means in communication with the fluid passageway of said outer sleeve, means between said second sleeve and said shaft providing for communication of the fluid passageway means of said second sleeve with the internal axial bore of said shaft, said second sleeve being spaced from said outer sleeve to provide for deflection of said shaft therebetween, and means between said sleeves on opposite sides of the fluid passageway in said outer sleeve and the fluid passageway means in said second sleeve to prevent leakage of fluid axially through the clearance between said sleeves.

8. Means for admitting fluid under pressure from a stationary fluid conduit into an internal axial bore in a rotating shaft comprising inner, intermediate, and outer sleeves disposed coaxially of said shaft, said inner sleeve being fixed on said shaft and having a fluid passageway communicating with said bore, said intermediate sleeve having fluid passageway means communicating with the fluid passageway of said inner sleeve, said outer sleeve being fixed against rotation and having fluid passageway means to establish communication between said stationary fluid conduit and the fluid passageway means of said intermediate sleeve, said outer sleeve having clearance about said intermediate sleeve to provide for deflection of said shaft and said inner sleeve in the rotation of the same, means between said intermediate and said outer sleeves to prevent axial or rotational movement of the same with respect to each other and to said inner sleeve, and resilient sealing means between said outer and intermediate sleeves on opposite sides of the fluid passageways establishing communication therebetween to prevent leakage of fluid axially through the clearance therebetween, and fluid passageway means between said axial bore and the outer surface of said inner sleeve and the inner surface of said intermediate sleeve which together with said resilient sealing means between said outer sleeve and said intermediate sleeve floatingly support said intermediate sleeve between said inner and outer sleeves.

9. Means for admitting fluid under pressure from a stationary fluid conduit into an internal axial bore in a rotating shaft comprising inner, intermediate, and outer sleeves disposed coaxially of said shaft, said inner sleeve being fixed on said shaft and having a fluid passageway communicating with said bore, said intermediate sleeve having fluid passageway means communicating with the fluid passageway of said inner sleeve, said outer sleeve being fixed against rotation and having fluid passageway means to establish communicating between said stationary fluid conduit and the fluid passageway means of said intermediate sleeve, said outer sleeve having clearance about said intermediate sleeve to provide for deflection of said shaft and said inner sleeve in the rotation of the same, means between said intermediate and said outer sleeves to prevent axial or rotational movement of the same with respect to each other and to said inner sleeve, said intermediate sleeve having a pair of annular grooves in the outer periphery thereof one each on opposite sides of the fluid passageways to establish communication between said intermediate and outer sleeves, annular pressure sealing rings disposed in the annular grooves of said intermediate sleeve and normally biased outwardly into sealing engagement with the inner periphery of said outer sleeve to prevent leakage of fluid axially through the clearance between said outer and intermediate sleeves, and fluid passageway means between said axial bore and the outer surface of said inner sleeve and the inner surface of said intermediate sleeve which together with said sealing rings between said outer sleeve and said intermediate sleeve floatingly support said intermediate sleeve between said inner and outer sleeves.

BURTON L. MILLS.

REFERENCES CITED

The following references are of record in the file of this patent:

UNITED STATES PATENTS

| Number | Name | Date |
| --- | --- | --- |
| 2,187,147 | Englesson | Jan. 16, 1940 |
| 2,210,088 | Longfield | Aug. 6, 1940 |
| 2,028,152 | Gray | Jan. 21, 1936 |

FOREIGN PATENTS

| Number | Country | Date |
| --- | --- | --- |
| 37,639 | Netherlands | Feb. 16, 1936 |
| 508,833 | British | Feb. 22, 1938 |
| 540,718 | British | Jan. 1, 1940 |
| 420,485 | German | Oct. 24, 1925 |